(12) United States Patent  
DeRoller

(10) Patent No.: US 9,049,167 B2
(45) Date of Patent: Jun. 2, 2015

(54) MOBILE ACCESS NOTIFICATION SERVICE INTERFACE

(75) Inventor: Matthew DeRoller, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 54 days.

(21) Appl. No.: 13/096,681

(22) Filed: Apr. 28, 2011

(65) Prior Publication Data

US 2012/0274977 A1    Nov. 1, 2012

(51) Int. Cl.
*H04L 12/58* (2006.01)
*H04N 1/00* (2006.01)
*G06F 3/12* (2006.01)

(52) U.S. Cl.
CPC ............ *H04L 51/38* (2013.01); *H04N 1/00244* (2013.01); *G06F 3/1206* (2013.01); *G06F 3/126* (2013.01); *G06F 3/1292* (2013.01); *H04L 51/24* (2013.01)

(58) Field of Classification Search
USPC .................. 358/500, 505, 1.15, 504; 345/589; 726/126

See application file for complete search history.

(56) References Cited

U.S. PATENT DOCUMENTS

| | | | | |
|---|---|---|---|---|
| 7,519,736 | B2 * | 4/2009 | Parham .......................... | 709/244 |
| 7,672,003 | B2 * | 3/2010 | Dowling et al. .............. | 358/1.15 |
| 2002/0044299 | A1 * | 4/2002 | Iwase et al. ................... | 358/1.15 |
| 2002/0174195 | A1 * | 11/2002 | Meyer et al. .................. | 709/219 |
| 2003/0067624 | A1 * | 4/2003 | Anderson et al. ............. | 358/1.15 |
| 2008/0151298 | A1 * | 6/2008 | Kurotsu ........................ | 358/1.15 |
| 2010/0011424 | A1 * | 1/2010 | Ushiku ............................. | 726/5 |
| 2010/0299208 | A1 * | 11/2010 | Carlson et al. ............. | 705/14.64 |
| 2011/0102171 | A1 * | 5/2011 | Raji et al. .................. | 340/539.11 |
| 2011/0218880 | A1 * | 9/2011 | Hammad et al. ........... | 705/26.41 |
| 2012/0057689 | A1 * | 3/2012 | Martin ...................... | 379/207.02 |
| 2012/0117481 | A1 * | 5/2012 | Stevens et al. ................ | 715/738 |
| 2012/0191600 | A1 * | 7/2012 | Boot .............................. | 705/40 |

OTHER PUBLICATIONS

Xerox Mobile Print Solution, *Business Challenge*, http://www.office.xerox.com/software-solutions/xerox-mobile-print-solution/enus.html, Feb. 21, 2011, pp. 1-2.

(Continued)

*Primary Examiner* — Jerome Grant, II

(57) ABSTRACT

Apparatus are provided that include a mobile access notification service interface configured to operate on messages targeting a mobile access notification service so that a given message targeting a given user via the mobile access notification service causes a access notice indicator of the given user's mobile data communication device to visibly show when data from the given message is ready for access via one or more designated non-mobile access devices. The mobile access notification service interface includes an access notification trigger data detector configured to process and identify, from among plural messages originating at message source machines, access notification messages containing access notification trigger data. A mobile access notification service linking mechanism is configured to link access notification messages containing the access notification trigger data to access notice indicators on corresponding targeted user mobile data communication devices, to link the access notification messages to one or more non-mobile access devices for access of content of the access notification messages at those non-mobile access devices, and to communicate non-mobile access device access code information to the targeted users for controlled user access at the one or more non-mobile access devices.

12 Claims, 3 Drawing Sheets

(56) References Cited

OTHER PUBLICATIONS

Xerox Mobile Print Solution, *Compatible Products*, http://www.office.xerox.com/software-solutions/xerox-mobile-print-solution/enus.html, Feb. 21, 2011, pp. 1-2.

Xerox Mobile Print Solution, *Xerox Solutions*, http://www.office.xerox.com/software-solutions/xerox-mobile-print-solution/enus.html, Feb. 21, 2011, pp. 1-2.

Xerox Mobile Print Solution, *Overview*, htpp://www.office.xerox.com/software-solutions/xerox-mobile-print-solution/enus.html, Feb. 21, 2011, pp. 1-2.

Brochure, *Xerox Extensible Interface Platform (EIP)*, for Xerox Corporation, 2008, pp. 1-4.

Brochure, *Xerox Mobile Print Solution*, for Xerox Corporation, 2010, pp. 1-4.

\* cited by examiner

MOBILE ACCESS NOTIFICATION SERVICE INTERFACE

FIELD OF THE DISCLOSURE

Aspects of the present disclosure relate to tools for providing and managing access to messages and documents.

BACKGROUND

Mobile communications devices generally use email and other communication applications to send and receive information, for example, using text messaging, Facebook, LinkedIn, and other applications. Much effort has been made to help mobile device users organize and manage the messages they receive and to prioritize these messages, for example, based on content. Meanwhile, effort is being made to help the senders of these messages draw attention to their messages.

SUMMARY OF THE DISCLOSURE

In accordance with one aspect of the present disclosure, apparatus are provided that include a mobile access notification service interface configured to operate on messages targeting a mobile access notification service so that a given message targeting a given user via the mobile access notification service causes a access notice indicator of the given user's mobile data communication device to visibly show when data from the given message is ready for access via one or more designated non-mobile access devices. The mobile access notification service interface includes an access notification trigger data detector configured to process and identify, from among plural messages originating at message source machines, access notification messages containing access notification trigger data. A mobile access notification service linking mechanism is configured to link access notification messages containing the access notification trigger data to access notice indicators on corresponding targeted user mobile data communication devices, to link the access notification messages to one or more non-mobile access devices for access of content of the access notification messages at those non-mobile access devices, and to communicate non-mobile access device access code information to the targeted users for controlled user access at the one or more non-mobile access devices.

BRIEF DESCRIPTION OF THE DRAWINGS

Embodiments of the disclosure are further described in the detailed description which follows, by reference to the noted drawings, in which like reference numerals represents similar parts throughout the several views of the drawings, and wherein.

DETAILED DESCRIPTION

Aspects of the disclosure are directed to a communication system that includes a mobile access notification service interface. The mobile access notification service interface is configured to operate on messages targeting a mobile access notification service so that a given message targeting a given user via the mobile access notification service causes a access notice indicator of the given user's mobile data communication device to visibly show when data from the given message is ready for access via one or more designated non-mobile access devices. The mobile access notification service interface includes an access notification trigger data detector configured to process and identify access notification messages containing access notification trigger data. A mobile access notification service linking mechanism is configured to link access notification messages containing the access notification trigger data to the access notice indicators, and to link the access notification messages to one or more non-mobile access devices for access of content of the access notification messages. In the illustrated embodiment shown in FIG. 1, the mobile access notification service interface is the email-mobile print service interface 26, the mobile access notification service is the mobile print server 20, the access notice indicator is the printable notice indicator, the access notification trigger data detector is the trigger data detector 28, and the mobile access notification service linking mechanism is the linking mechanism 30. In the illustrated embodiment shown in FIG. 1, a message is an email, and a non-mobile access device is a designated print device, such as a multifunction device. In the illustrated embodiment, access notification trigger data is print service trigger data.

Figure 1:
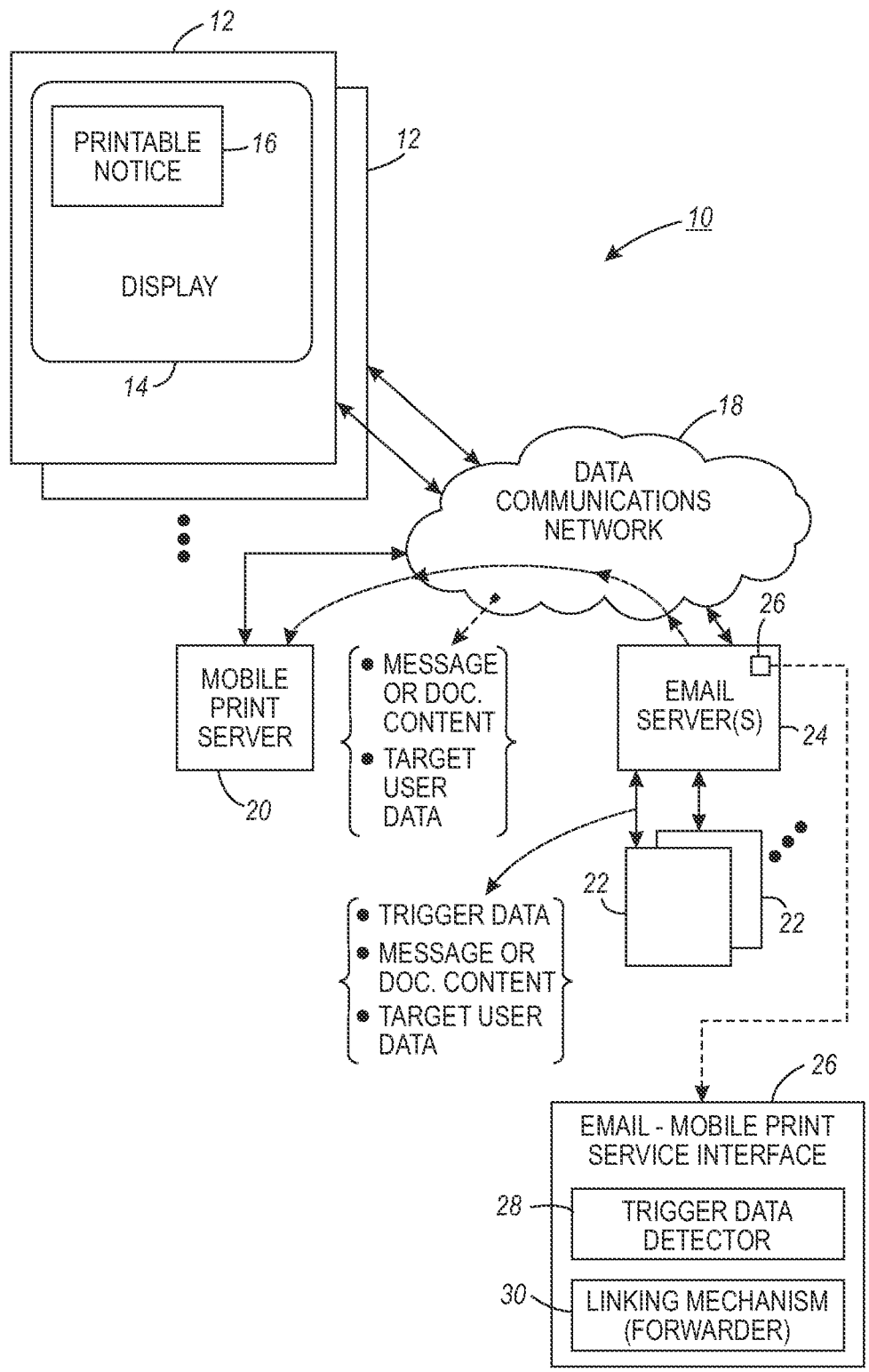
FIG. 1 is a block diagram of one embodiment of a communication system with a mobile access notification service interface.

Referring now to the drawings in greater detail, FIG. 1 shows a block diagram of a communication system 10 that includes a data communication network 18 that is in communication with one or more mobile data communication devices 12 configured to transmit and/or receive a variety of types of messages and data to and from other devices via the data communication network 18. The data communication network 18 is also in communication with a plurality of servers, including a mobile print server 20 and one or more email servers 24. An email-mobile print service interface 26 is in communication with one or more of the email servers 24, and is configured to operate on emails passing through the email servers 24 to identify those emails that are targeting the mobile print server 20.

The messages (emails) that pass through the email servers 24 are received from one or more message source machines 22. These machines can include, but are not limited to computers and mobile data communication devices, such as mobile phones. The emails received from the message source machines 22 by the email servers 24 are configured to be communicated to the email-mobile print service interface 26, which in the illustrated embodiment is configured to operate on those emails to determine if those emails are targeting the mobile print server 20.

The email-mobile print service interface 26 is configured to filter the emails received from the message source machines 22 through the email servers 24 in a variety of ways to filter out the emails that should be transmitted to the mobile print server 20. In the illustrated embodiment, the email-mobile print service interface 26 includes a trigger data detector 28 that is configured to process and identify emails that contain print service trigger data. When print service trigger data is detected in an email by the trigger data detector 28, that email is transmitted via the data communications network 18 to the mobile print server 20, and the intended recipient of that email receives a notification on a mobile data communication device 12 indicating that data associated with the filtered email is available for accessing by the user, as will be discussed in more detail below.

The type of information that can constitute print service trigger data can vary, and can be a trigger specifically included in the email by the user originating the email, or can be the type of information or data contained or embedded in the email itself. For example, the print service trigger data can be in the form of the content of the message or document, or information about the targeted user. In one embodiment, the print service trigger data can be in the form of indicia within the email that the email has an office administration purpose. In another embodiment, the print service trigger data can be in the form of indicia that an email pertains to a particular office location. In another embodiment, the print service trigger data can be in the form of indicia that an email has a building management purpose. In another embodiment, the print service trigger data can be in the form of indicia that an email includes managed service provider instructions. In another embodiment, the print service trigger data can be in the form of indicia that an email includes advertising designated for communication via the mobile print server. In another embodiment, the print service trigger data can be in the form of an email address of the email such that the email is addressed to the mobile print server 20.

Once an email has been identified by the trigger data detector 28 as containing print service trigger data, the mobile print service linking mechanism 30 of the email-mobile print service interface 26 is configured to perform a variety of functions based upon that indication to allow the targeted user to access the content of the email. The mobile print service linking mechanism 30 is configured to link the emails containing print service trigger data to a notice indicator 16 on a mobile data communication device 12 to indicate to the targeted user of the mobile data communication device 12 that data from an email is available to be viewed and/or printed at one or more designated print devices through the mobile print server 20. The mobile print service linking mechanism 30 also acts as an email forwarder such that it is configured to link the email to the one or more designated print devices through the mobile print server 20 to allow for access to the content of the emails at the designated print devices.

In one embodiment, the designated print devices are configured to receive input from the targeted user to give the targeted user access to the available email content. The mobile print service linking mechanism 30 is configured to allow the user to access the content of the email at the designated print devices by providing information, such as an access code, for entering into the designated print devices such that the user can view and/or print the content of the email at the designated print devices. For example, the mobile print service linking mechanism 30 provides an access code to the targeted user in the printable notice indicator 16 such that the targeted user can enter the access code into one or the designated print devices. Entering the access code can give the targeted user access to the content of the email forwarded to the mobile print server 20. In general, any type of access information can be used to give a user access to the data at the designated print devices.

The mobile print server 20 is a server that accepts forwarded messages from the email-mobile print service interface 26 that is determined to contain print service trigger data therein. The mobile print server 20 stores the email content from those messages for access by a targeted user such that targeted user can view and/or print the content at a designated print server. A variety of servers can be used for the mobile print server 20, including but not limited to the Xerox Mobile Print Solution.

The mobile data communication device 12 can be any device that allows for mobile communication, including cellular telephones, smartphones, and mobile computer devices such as laptop computers and tablet computers. In the illustrated embodiment, the mobile data communication device 12 includes a display 14 and interactive buttons to allow the user to communicate with the mobile data communication device 12. In addition, the mobile data communication device 12 can optionally include a keyboard element and/or graphical tools to allow additional communication with the mobile data communication device 12. In the illustrated embodiment, the display 14 includes the printable notice indicator 16 that is configured to show the targeted user when data from an email is ready for access by the user at the designated print devices. This allows a user to be notified of an email sent to the user that is available for viewing and/or printing at the designated print devices using the mobile print server 20 rather than the email servers 24.

As discussed above, the mobile data communication device 12 includes a printable notice indicator 16 that is configured to show the user of the mobile data communication device 12 when data from an email at the mobile print server 20 is ready for access via one or more of the designated print devices. The notice indicator 16 can indicate a variety of data ready for accessing to the user, including both printed and not-yet printed data. The data can also be available for a variety of types of access, including display access on one or more of the designated print devices, and/or print access for printing on one or more of the designated print devices. The notice indicator 16 can indicate available content to the targeted user in a variety of ways. For example, the notice indicator 16 can simply include an indication that available content exists, or the notice indicator 16 can display the subject of the original email or various other types of information about the email or the content to provide some information to the targeted user regarding the type of content that is available.

Figure 2:
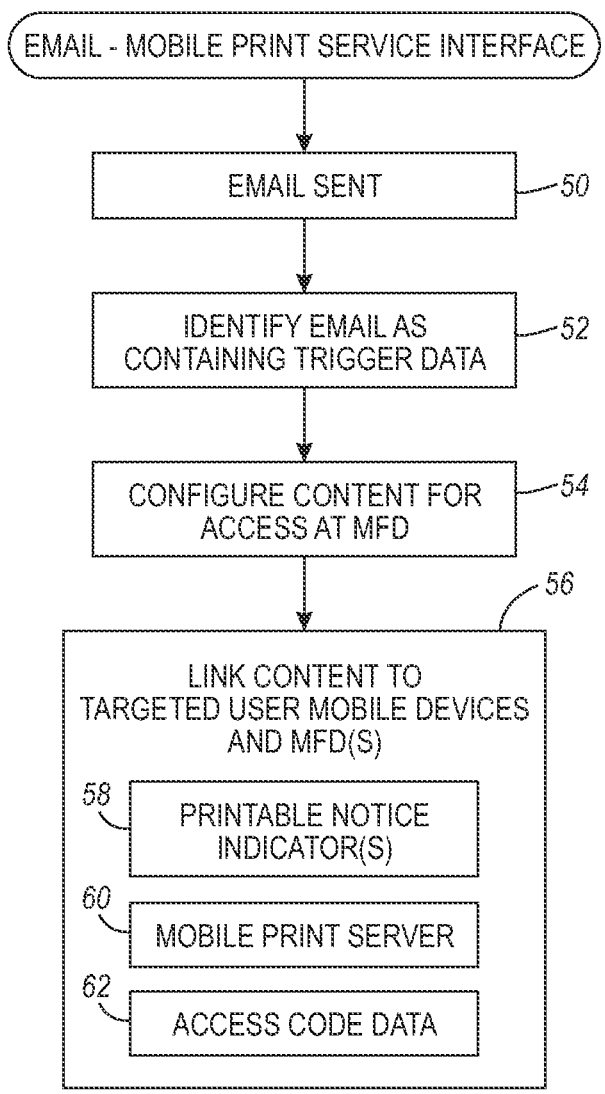
FIG. 2 is a flowchart of a process for filtering emails such that those emails containing trigger data are sent to a mobile print server.

FIG. 2 shows a flow chart of an embodiment of the process performed by the email-mobile print service interface to filter emails sent from the plurality of message source machines such that those emails containing trigger data are sent to a mobile print server. In act 50, an email is sent from a message source machine. The email is communicated through an email server to the email-mobile print service interface, and in act 52, the email-mobile print service interface identifies the mail as containing trigger data. This triggers the email-mobile print service interface to forward the email to the mobile print server. In act 54, the content of the email is configured for access at the designated print devices, such as a multi-function device. In act 56, the content of the email is linked to the targeted user's mobile data communication device using the printable notice indicator 58, and to the designated print devices through the mobile print server 60. Access code data 62 is also transmitted to the user's mobile data communication device to allow the user to access the data on the designated print devices.

Figure 3:
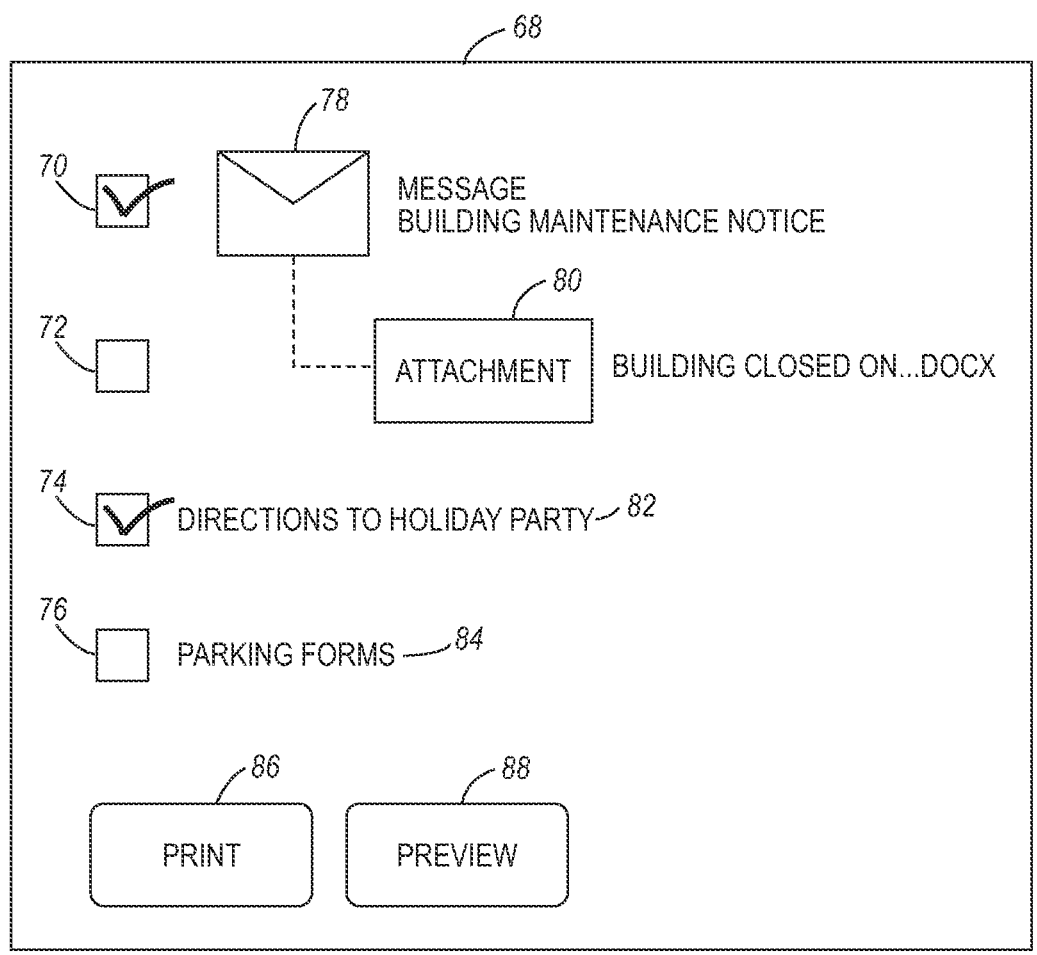
FIG. 3 is a functional schematic diagram of a screen or a window of a designated print device in one embodiment of the disclosure.

FIG. 3 is a schematic block diagram showing a display on a designated print device of the data that is ready for printing and/or viewing from an email sent to the user that is available through the mobile print server 20. The display 68 of the designated print device shows various data from emails sent to the user that are ready for access on the designated print device, including a message regarding a building maintenance notice 78 with an attachment 80, directions to a holiday party 82, and parking forms 84. A checkbox 70, 72, 74, 76 corresponds to each displayed message to allow the user to select one or more of those messages for either printing 86 or viewing in a preview 88. Any type of mechanism for selecting the various messages can be used, and the display can also show the user additional information regarding the messages, such as the sender of the message or a time stamp of when the message was sent to the user.

The processes or functions performed by the components of the system shown in the figures herein may be performed by a mobile device that includes a processor and computer-readable media. The device can also include a bus or other data holding/transfer structures. The computer-readable media may include memory or data storage devices including, by way of example, such storage devices with temporary memory, such as in a random access memory of a given computer, and/or longer-term storage devices, including disc media such as magnetic disks and optical disks. For the disclosure herein, computer-readable media may include any form of data storage mechanism as well as hardware and circuit representations of the structures or data that a data storage mechanism might represent.

The claims as originally presented, and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. An apparatus comprising:
    a print trigger data detector for receiving a plurality of emails sent to a mobile access notification service and addressed to a targeted mobile data communication device of a targeted user and detecting an email containing a print trigger data of the plurality of emails intended for the targeted mobile data communication device of the targeted user from a first mobile data communication device of a first user, wherein the print trigger data indicates that the email contains content to be printed; and
    a mobile print service linking mechanism for forwarding the email containing the print trigger data to a mobile print server, forwarding a notification to a notice indicator on the targeted mobile data communication device that the content is available on the mobile print server, linking the email to a multi-function device selected by the targeted user to allow for access of the content on the mobile print server and communicating an access code to the targeted mobile data communication device to access the content in the email at the mobile print server.

2. The apparatus of claim 1, wherein the mobile access notification service comprises a Xerox mobile print solution.

3. The apparatus of claim 1, wherein the plurality of email messages is configured to be sent via an email server.

4. The apparatus of claim 1, wherein the print trigger data includes indicia that a given email has an office administration purpose.

5. The apparatus of claim 1, wherein the print trigger data includes indicia that the email pertains to a particular office location.

6. The apparatus of claim 1, wherein the print trigger data includes indicia that the email has a building management purpose.

7. The apparatus of claim 1, wherein the print trigger data includes indicia that the email includes managed service provider instructions.

8. The apparatus of claim 1, wherein the print trigger data includes indicia that the email includes advertising designated for communication via the mobile access notification service.

9. The apparatus of claim 1, wherein the notification indicates when yet-to-be printed content is ready for access.

10. The apparatus of claim 1, wherein the notification indicates that content is ready for display access.

11. A method comprising:
    detecting an email message from among a plurality of email messages that contains a print trigger data, wherein the print trigger data indicates that the email message contains content to be printed, wherein the email message is sent from a first user of a first mobile data communication device to a mobile access notification service and addressed to a targeted user of a targeted mobile data communication device;
    forwarding the email message to a mobile print server;
    transmitting an indication to an access notice indicator on a screen of the targeted mobile data communication device, the indication being such that the targeted user is notified of the content from the email message is available via the mobile print server, wherein the indication includes an access code to access the content in the email message at the mobile print server; and
    linking the email to a multi-function device (MFD) selected by the targeted user to allow for access of the content on the mobile printer server.

12. A non-transitory computer-readable medium encoded with data, the encoded data interoperable with a machine to cause:
    detecting an email message from among a plurality of email messages that contains a print trigger data, wherein the print trigger data indicates that the email message contains content to be printed, wherein the email message is sent from a first user of a first mobile data communication device to a mobile access notification service and addressed to a targeted user of a targeted mobile data communication device;
    forwarding the email message to a mobile print server;
    transmitting an indication to an access notice indicator on a screen of the targeted mobile data communication device, the indication being such that the targeted user is notified of the content from the email message is available via the mobile print server, wherein the indication includes an access code to access the content in the email message at the mobile print server; and
    linking the email to a multi-function device (MFD) selected by the targeted user to allow for access of the content on the mobile printer server.

* * * * *